United States Patent [19]

Matsuura et al.

[11] Patent Number: 4,641,150

[45] Date of Patent: Feb. 3, 1987

[54] THERMAL PRINTER

[75] Inventors: Takanobu Matsuura, Takizawa; Toshiyuki Yamamoto, Tamayama, both of Japan

[73] Assignee: Alps Electric Co., Ltd., Japan

[21] Appl. No.: 793,685

[22] Filed: Oct. 31, 1985

[30] Foreign Application Priority Data

Oct. 31, 1984 [JP] Japan ........................... 59-163748[U]

[51] Int. Cl.[4] ............................................ G01D 15/10

[52] U.S. Cl. ................................ 346/76 PH; 346/105; 346/139 R; 400/120; 400/229

[58] Field of Search .............. 346/76 PH, 105, 139 R; 400/120, 229; 219/216 PH

[56] References Cited

U.S. PATENT DOCUMENTS

| | | | |
|---|---|---|---|
| 4,468,139 | 8/1984 | Hattori | 346/76 PH |
| 4,563,692 | 6/1986 | Negita et al. | 346/76 PH |

*Primary Examiner*—Arthur G. Evans

*Attorney, Agent, or Firm*—Guy W. Shoup

[57] ABSTRACT

A thermal printer having a reciprocable carriage on which a thermal head is carried. The printer further includes a rotatable gear for winding print tape, a toothed rack that can move toward and away from the winding gear, and a driving plate for reciprocating the rack in association with the rotation of the carriage. When characters are to be printed, the carriage is rotated to the platen, and the teeth of the rack are brought into mesh with the winding gear. When no characters are printed, the carriage is angularly moved away from the platen, and the teeth of the rack are disengaged from the winding gear.

3 Claims, 18 Drawing Figures

THERMAL PRINTER

FIELD OF THE INVENTION

The present invention relates to a thermal printer and, more particularly, to a thermal printer having a carriage that is equipped with a thermal head and capable of reciprocating along the line to be printed.

BACKGROUND OF THE INVENTION

A thermal printer has been developed in which print tape having a heat-fusible material is disposed between paper and a thermal head that is equipped with heater elements. As the thermal head is moved, the heater elements are selectively heated to melt the heat-fusible material in the tape. The molten material is then transferred to the paper. This printer has the advantage that during printing operation it generates less noise than other kinds of printers.

The conventional thermal printer is shown in FIGS. 9–14, of which FIG. 9 is a plan view of the printer, for showing the whole structure of the printer. In this figure, paper (not shown) is wound on a platen 1. A rubber member 2 is mounted in front of the platen 1, i.e., at the print position. A paper guide 3 acts to guide the paper wound on the platen 1. A thermal head 4 is disposed opposite to the rubber member 2, and has a plurality of heater elements. The head 4 is mounted on a carriage 5. Print tape 6 has a heat-fusible material that is to be transferred to the paper. The tape 6 is received in a tape cassette 7, which is detachably mounted to the carriage 5.

The carriage 5 is movably mounted to a carriage guide plate 8. Referring also to FIG. 10(*a*), the plate 8 is rotatably supported at locations 9. As shown in FIG. 10(*a*) and (*b*), a carriage guide shaft 10 firmly secured to the carriage 5 is guided by a groove 11. The plate 8, the guide shaft 10, and the groove 11 constitute a carriage guide mechanism that guides the carriage 5 along the front surface of the platen 1. A compression spring 12 urges the carriage 5 on the carriage guide plate 8, hence the thermal head 4, toward the rubber member 2.

Referring to FIG. 9, a wire 13 has its ends connected to both ends of the carriage 5. The wire 13 is wound on pulleys 14 and 15 that are disposed on the side of the carriage guide plate 8. The wire 13 is also wound on a driving pulley 16 having gears, for example, at its both sides. The wire 13, the pulleys 14, 15, and the driving pulley 16 constitute a carriage-moving means that moves the carriage 5 along the platen 1. The paper is pressed on a paper feed roller 17 which is secured to a paper feed shaft 18. The roller 17 and the shaft 18 constitute a paper feed means that transports the paper in the direction indicated by the arrow A in FIG. 9.

Referring still to FIG. 9, a stepper motor 19 has a motor gear 20 mounted on its output shaft. An idle gear 21 which is in mesh with the gear 20 is in mesh with the gear on one side of the driving pulley 16. A first intermittent gear 22 is in mesh with the gear on the other side of the pulley 16. A second intermittent gear 23 is in mesh with the first intermittent gear 22. A paper feed gear 24 engages with the second intermittent gear 23. A movable contact is mounted to a mount 25. A ratchet 26 is in mesh with the paper feed gear 24. Another ratchet 27 can come into and out of engagement with the ratchet 26. A ratchet spring 28 urges the ratchet 27 into engagement with the ratchet 26. One end of the spring 28 is made fixed by a washer 29. A knob 30 that is manually operated to move the ratchet 27 away from the ratchet 26. The knob 30 has a gear on its periphery, the gear being capable of engaging with a gear formed on the ratchet 27. The knob 30 is rotatably held to a lever 31.

The aforementioned motor gear 20, idle gear 21, driving pulley 16, first intermittent gear 22, second intermittent gear 23, and paper feed gear 24 constitute a gearing which operates the carriage-moving means and the paper feed means in an interlocked relation. That is, this gearing reciprocates the carriage 5, and moves the paper a certain amount in the direction indicated by the arrow B in FIG. 9 whenever the carriage 5 makes one reciprocation. The aforementioned ratchets 26, 27, and the knob 30 constitute a manual paper feed mechanism that permits one to manually move the paper backward, i.e., in the direction indicated by the arrow C in FIG. 9.

As shown in FIGS. 9 and 12, a driving gear 32 is mounted on the shaft extending from the gear 20 on the motor 19. This gear 32 is coupled to a contact gear 34 via an idler 33. The contact gear 34 is composed of a fixed gear **34*a* and an abutment gear 34*b*. The fixed gear 34*a* is in mesh with the driving gear 32. The abutment gear 34*b* is urged into abutment with the fixed gear 34*a* by a spring 35. The contact gear 34 is in mesh with a rack member 36 disposed opposite to the gear 34. The rack member 36 consists of two rows of teeth, one of which is an incomplete tooth portion 36*a*. This tooth portion 36*a* is missing teeth at its both ends, and is in mesh with the fixed gear 34*a*. The other row of teeth is a complete tooth portion 36*b* that is in mesh with the abutment gear 34*b*. The driving gear 32, the contact gear 34, the rack member 36, and other components constitute a cam operation means. A T-shaped protrusion 37 formed on the rack member 36 is reciprocable in a space 38*d* formed in a cam 38, which is composed of a lower portion 38*a*, a higher portion 38*b*, and an inclined portion 38*c* formed between them as shown in FIG. 11**.

The cam 38 abuts on the shaft portion 40 of a receiving portion 39 extending from the support portion 9 of the carriage guide plate 8, as shown in FIGS. 10 and 11. Accordingly, when the pin 40 protruding from the receiving portion 39 rides on the lower portion **38*a* of the cam 38 as shown in FIG. 11**(*a*), the thermal head 4 is in contact with the platen 1. When the pin 40 rides on the higher portion **38*b* of the cam 38 as shown in FIG. 11**(*b*), the thermal head 4 is urged away from the platen 1 against the action of the compression spring 12. Under this condition, the carriage 5 is moved, i.e., returned, by the aforementioned wire 13.

The driving gear 32 of the cam operation means is always driven by the motor 19. The stroke that the cam 38 or the rack member 36 travels is made constant by a stopper 41. Therefore, the rack member 36 is designed to consist of the two rows, i.e., the incomplete tooth portion **36*a* and the complete tooth portion 36*b*. The fixed gear 34*a* of the contact gear 34 is in mesh with the incomplete tooth portion 36*a*. In order that when the pin 40 is placed at any arbitrary position on the cam 38, i.e., when the contact gear 34 is placed at either end of the rack member 36, the driving force of the motor 19 be not directly transferred to either the rack member 36 or the cam 38, the fixed gear 34*a* is not in mesh with the rack member 36, and the abutment gear 34*b*** is caused to run idle.

Further, in order to prevent the components from being adversely affected by the rapid change in the speed of the motor 19 as it is reversed, the protrusion 37 on the rack member 36 is situated in the space 38*d* in the cam 38, and a clearance is formed between the rack member 36 and the cam 38. As shown in FIG. 5, the wire 13 engages the carriage 5 in the manner described below. A clearance D is formed between an enlarged portion 13*a* formed on the wire 13 and a frame 5*a* that is formed on the carriage 5. Thus, the carriage 5 is not allowed to move until the platen 1 and the thermal head 4 completely assume their other arbitary states.

The mechanism for winding the print tape 6 is now described by referring to FIGS. 14 and 15. As shown in FIGS. 10 and 14, a winding rack 42 is mounted below the rubber member 2 and extends along the whole length of the region in which the carriage 5 can move. A winding gear 43 which can come into mesh with the winding rack 42 is mounted in the carriage 5. The gear 43 is connected to a winding bobbin unit 47 via a first intermediate gear 44, a second intermediate gear 45, and a third intermediate gear 46. The winding gear 43 can move slightly from the center of rotation of the first intermediate gear 44 toward the rack 42. A spring member 48 resiliently urges the winding gear 43 toward the rack 42. The gear 43 is made movable as described above to prevent the addendums of the rack 42 and of the gear 43 from becoming damaged when the gear 43 engages the rack 42. That is, the addendums of the gear 43 cease to be in contact with the rack 42 immediately after the gear 43 comes into mesh with the rack 42.

FIG. 15 is a front elevation of the aforementioned winding bobbin unit 47. As can be seen from this figure, a compression spring 51 is mounted between a winding bobbin 50 and a unit gear 49 that comes into mesh with the third intermediate gear 46. The gear 49 is pressed against a friction member 52 on a bobbin pulley 53 by the resilience of the spring 51, the friction member 52 being made of felt. The frictional resistance produced in this way permits the rotating force of the gear 49 to be transmitted to the bobbin pulley 53 to thereby rotate the bobbin 50. When the load applied to the winding bobbin unit 47 exceeds a certain value, the pulley 53 slips on the unit gear 49, so that the winding of the print tape is terminated.

In the conventional thermal printer constructed as described above, the winding rack 42 is fixed on the side of the platen 1 as shown in FIG. 10(*a*), and the carriage 5 that supports the winding gear 43 is rotated. Thus, the gear 43 can come into and out of mesh with the teeth of the rack 42. Since the angular range through which the thermal head can rotate relative to the platen is made large to afford a sufficient space, the angular range through which the carriage 5 can move is limited. For this reason, the module for the winding gear 43 or other gear cannot be made very large. Thus, the gear 43 may not come into mesh with the winding rack 42 if the rack 42 is slightly bent. Under this condition, the operation for winding the print tape is unstable.

FIG. 16 is a diagram showing the characteristic of the load that is applied to press the thermal head against the platen in the conventional thermal printer. In this diagram, point X indicates the load when the thermal head 4 is away from the platen 1, i.e., the head is up. Point Y indicates the load when the head 4 just comes into contact with the platen 1. Point Z indicates the load when the head 4 is pressed on the platen 1, i.e., the head is down. Point F indicates the force applied to the platen 1 by the head 4.

The mechanism for rotating the carriage 5 in the conventional thermal printer is designed as shown in FIG. 11, and therefore the tensile force of the compression spring 12 presses the head on the platen when the head is down. When the head is up, the spring 12 is stretched further and so the load needed for the stretch is considerably larger than the force applied to press the head on the platen. Consequently, the electric power consumed by the driving motor is large.

SUMMARY OF THE INVENTION

It is the main object of the present invention to provide a thermal printer which is free of the foregoing difficulties with the prior art technique and which operates reliably in that it can wind print tape with certainty.

This object is achieved in accordance with the teachings of the present invention by a thermal printer comprising: a platen; a carriage capable of reciprocating along the line to bé printed, the carriage angularly moving toward the platen when the line is to be printed, the carriage angularly moving away from the platen when no line is printed; a gear for winding print tape, the gear being rotatably mounted to the carriage; a winding rack capable of moving toward and away from the winding gear, the rack having a number of teeth arrayed along the line to be printed; and a rack driving means for causing the rack to move toward and away from the winding gear in association with the angular movement of the carriage; and wherein when the line is to be printed, the carriage is angularly moved toward the platen, and the rack driving means acts to move the winding rack toward the side of the winding gear to bring the teeth of the winding rack into mesh with the winding gear; and wherein when no line is printed, the carriage is angularly moved away from the platen, and the rack driving means moves the winding rack away from the winding gear to disengage the teeth of the winding rack from the winding gear.

Other objects and features of the invention will appear in the course of description that follows.

BRIEF DESCRIPTION OF THE DRAWINGS

FIG. 10(*b*) is a cross-sectional view of the carriage and its surroundings of the printer shown in FIG. 9;

FIG. 11(*b*) is a fragmentary side elevation of the printer shown in FIG. 9, for showing the operation for elevating the thermal head;

DETAILED DESCRIPTION OF THE INVENTION

Figure 1:
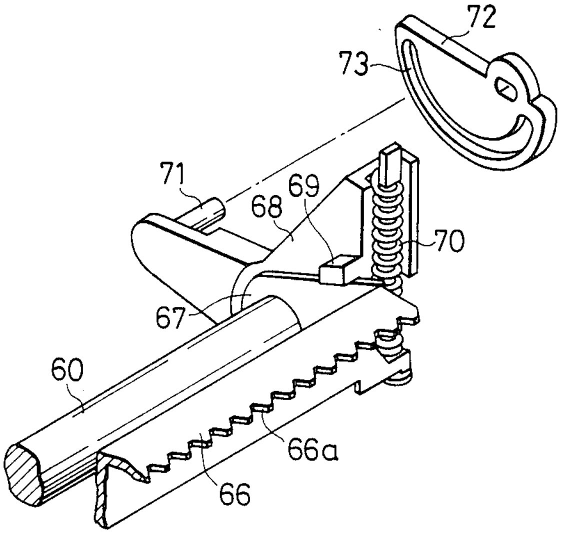
FIG. 1 is a perspective view of main portions of a thermal printer according to the present invention.
Figure 2:
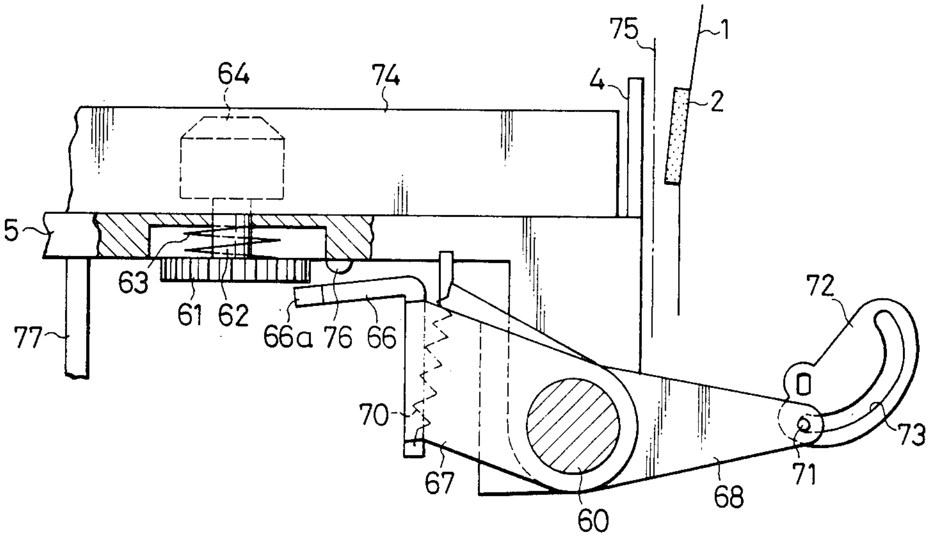
FIG. 2 is a side elevation of main portions of the printer shown in FIG. 1, for showing the relation between the winding rack and the winding gear when the head is up.
Figure 3:
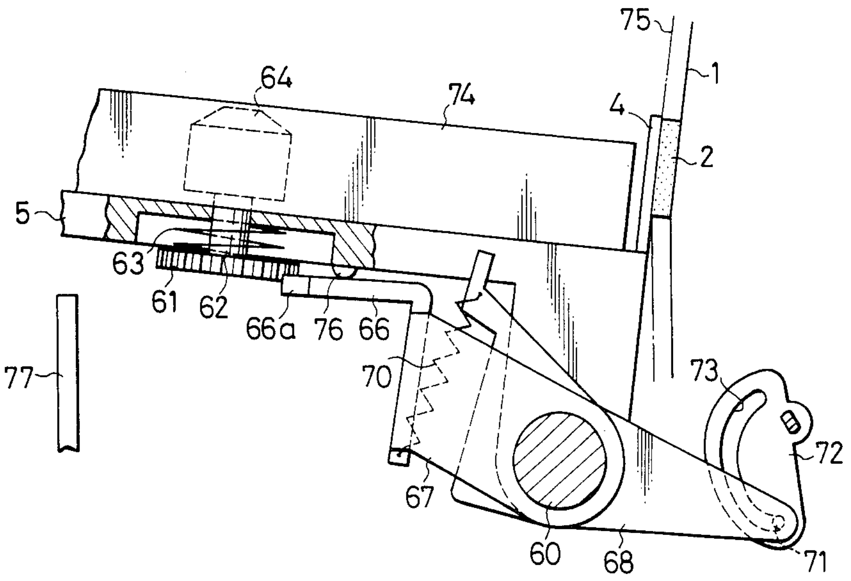
FIG. 3 is a view similar to FIG. 2, but showing the relation when the head is down.

A thermal printer according to the present invention is shown in FIGS. 1–5. This printer includes a platen 1, a carriage 5, and a shaft 60 extending parallel to the platen 1. The carriage 5 is rotatably held to the shaft 60 so as to be slidable axially of the shaft. As shown in FIGS. 2 and 3, a winding gear 61 is mounted at a certain position on the bottom of the carriage 5. This gear 61 is splined to a bobbin shaft 62, and is urged downwards at all times by a coiled spring 63. A winding bobbin unit including the bobbin shaft 62 has a slip mechanism that is substantially similar to that of the conventional printer. When a load exceeding a certain value is applied, the bobbin 64 is not allowed to rotate. A hook 65 facing downwards protrudes from the bottom of the carriage 5.

As shown in FIG. 1, a winding rack 66 of an L-shaped cross section is disposed parallel to the shaft 60. Protruding from both ends of the rack 66 are connector portions 67, through which the shaft 60 extends at their both ends. Thus, the rack 66 can rotate about the shaft 60. A number of teeth 66*a* which are formed on the front side of the rack 66 can come into mesh with the winding gear 61 (see FIG. 3). Also, the teeth 66*a* are capable of engaging the hook 65. A driving plate 68 is rotatably held to the shaft 60 in such a way that it overlaps one connector portion 67 of the winding rack 66. As shown in FIG. 1, a protrusion 69 which engages with the upper end of the connector portion 67 is formed on the end portion of the driving plate 68 which extends toward the winding rack 66. A tension spring 70 is mounted between the upper end of this end portion and the lower end of the rack 66 in a stretched manner. A pin 71 protrudes from the end portion of the plate 68 which extends on the opposite side to the rack 66. The front end of the pin 71 is fitted in a groove 73 formed in a cam 72.

Also shown in FIGS. 2 and 3 are a tape cassette 74 having print tape therein, paper 75 to be printed, a protrusion 76 that performs a pushing operation, and a carriage stopper 77.

Figure 4:
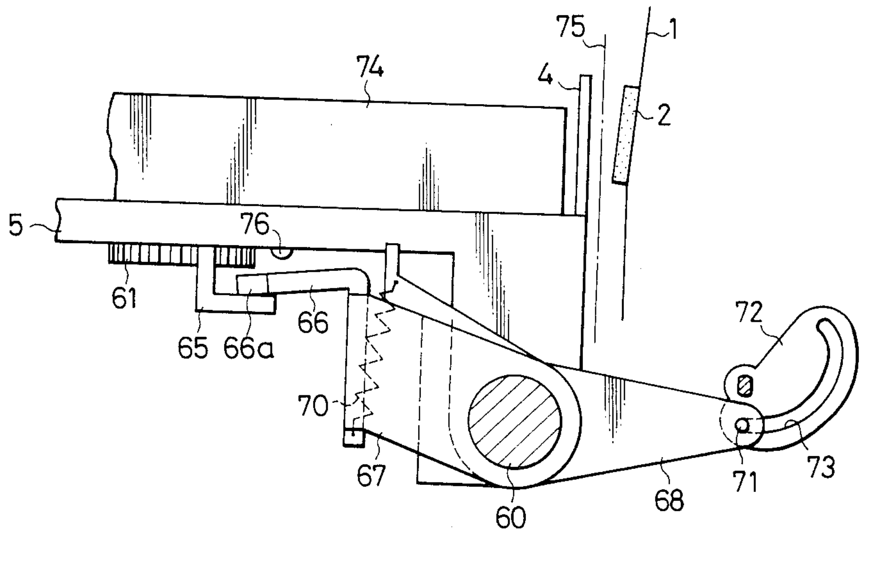
FIG. 4 is a side elevation of main portions of the printer shown in FIG. 1, for showing the relation between the winding rack and the carriage when the head is up.

FIGS. 2 and 4 show the condition in which the head is up. In this state, the pin 71 is at the end of the groove 73 that is closest to the center of rotation of the cam. Accordingly, the end of the driving plate 68 which is on the side of the winding rack 66 is at a position lower than the position assumed in the head-down condition shown in FIGS. 3 and 5. Under this condition of FIGS. 2 and 4, the connector portions 67 for the rack 66 are pushed down by the protrusion 69, so that the teeth 66*a* of the rack 66 face downwards. Thus, the front ends of the teeth 66*a* pushes the hook 65 downwardly, keeping the carriage 5 in such a condition that the thermal head 4 is away from the platen 1. The rack 66 disengages from the winding gear 61, because the teeth 66*a* face downwards. Therefore, when the carriage 5 reciprocates, the bobbin 64 will not turn, and the print tape will not be wound.

Figure 5:
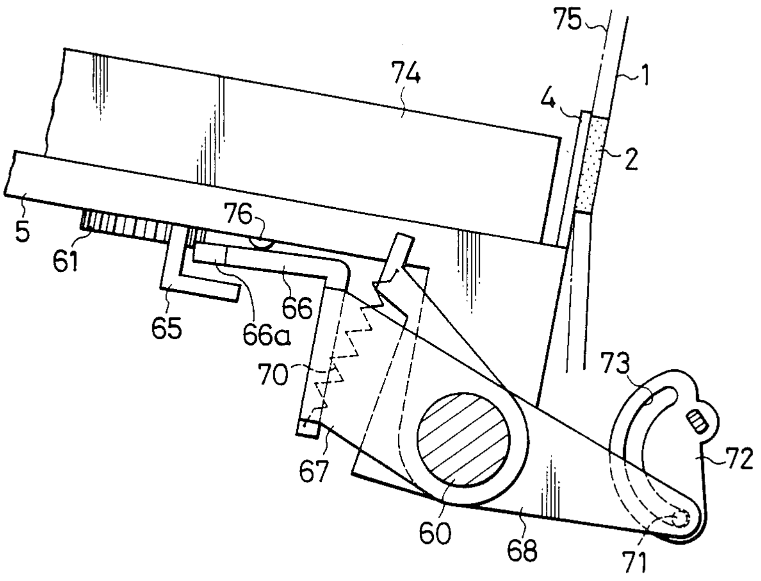
FIG. 5 is a view similar to FIG. 4, but showing the relation when the head is down.

FIGS. 3–5 show the condition in which the head is down. When the head is up as mentioned above, if the cam 72 is rotated in a clockwise direction, the pin 71 moves along the groove 73 in the cam and slowly moves away from the center of rotation of the cam 72. This rotates the driving plate 68 about the shaft 60 in a clockwise direction. The winding rack 66 is also rotated in a clockwise direction by being pulled by the tension spring 70. Then, the rack teeth 66*a* move away from the hook 65 and come into mesh with the teeth of winding gear 61. Simultaneously, the upper surface of the rack 66 bears against the protrusion 76 formed on the bottom of the carriage 5.

As the cam 72 turns further, the driving plate 68 and the winding rack 66 further rotate clockwise, rotating the carriage 5 toward the platen 1. As a result, the thermal head 4 comes into abutting engagement with the rubber member 2 via the paper 75. If the rack 66 is rotating, and if the rack teeth 66*a* and the teeth of the winding gear 61 maintain in abutment with each other without coming into mesh with each other, then the rotation of the rack 66 pushes the gear 61 upwardly while compressing the coiled spring 63 until the teeth of the gear 61 reach the position at which they can mesh with the rack teeth 66*a* during the movement of the carriage 5. Then, the spring 63 pushes the gear 61 downwardly, so that the teeth of the gear 61 come into mesh with the teeth 66*a*. As a result, the gear 61 is caused to rotate.

The cam 72 turns further, and the driving plate 68 continue to rotate clockwise. However, the winding rack 66 is not allowed to rotate, because the thermal head 4 bears on the rubber member 2. Accordingly, after the rotation of the rack 66 is stopped, the driving plate 68 is rotated while the tension spring 70 is stretched. This force eventually presses the head 4 against the platen, rotating the cam 72. When the pin 71 arrives at the end of the cam groove 73 that lies farthest from the center of rotation, as shown in FIGS. 3–5, a desired force F is given to the head 4, pressing it against the platen.

Figure 7:
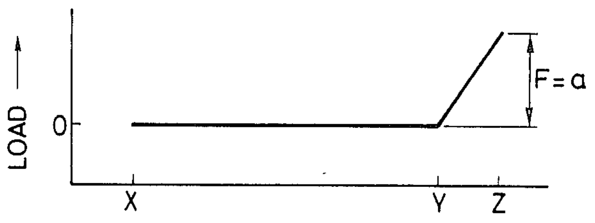
FIGS. 7 and 8 are diagrams showing the characteristics of loads applied to press the thermal heads of the embodiments of the invention against their platens.

FIG. 7 is a diagram showing the characteristic of the load applied to the thermal head of the thermal printer of this example to press the head against the platen from the head-up condition to the head-down condition. As can be seen from this diagram, the load is zero from the head-up condition (point X) until the thermal head 4 just comes into contact with the platen 1 (point Y). Then, the head is lowered, and load a is applied to stretch the tension spring 70 until the desired force F is obtained (point Z).

By pulling the carriage 5 while pressing the head 4 against the platen in this way, the winding gear 61 rotates on the teeth 66*a* of the winding rack 66. Then, the print tape in the tape cassette 74 is wound via the bobbin 64, corresponding to the distance traveled by the carriage 5.

In order to restore the printer to the head-up condition shown in FIGS. 2 and 4 from the head-down condition shown in FIGS. 3 and 5, the cam 72 is rotated in the opposite direction, i.e., in a counterclockwise direction. Then, operations opposite to the foregoing are performed. These operations will not be described herein.

Figure 6:
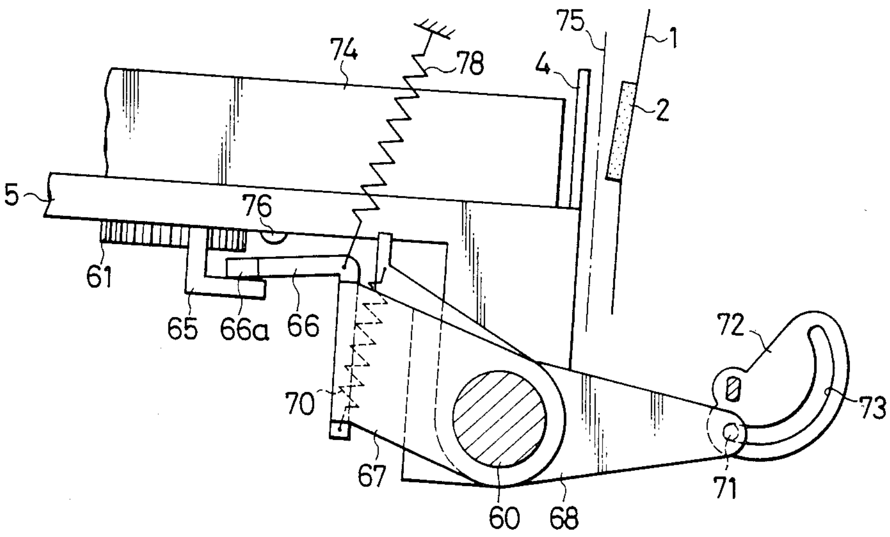
FIG. 6 is a side elevation of main portions of another thermal printer according to the invention, for showing the relation between the winding rack and the carriage.

Referring next to FIG. 6, there is shown another thermal printer according to the invention which is similar to the printer described above except that it further includes an auxiliary spring 78 to rotate the winding rack 66 clockwise about the shaft 60, i.e., in the direction to press the thermal head 4 against the platen.

Figure 8:
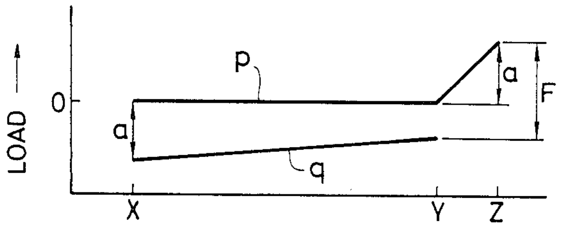
Figure 9:
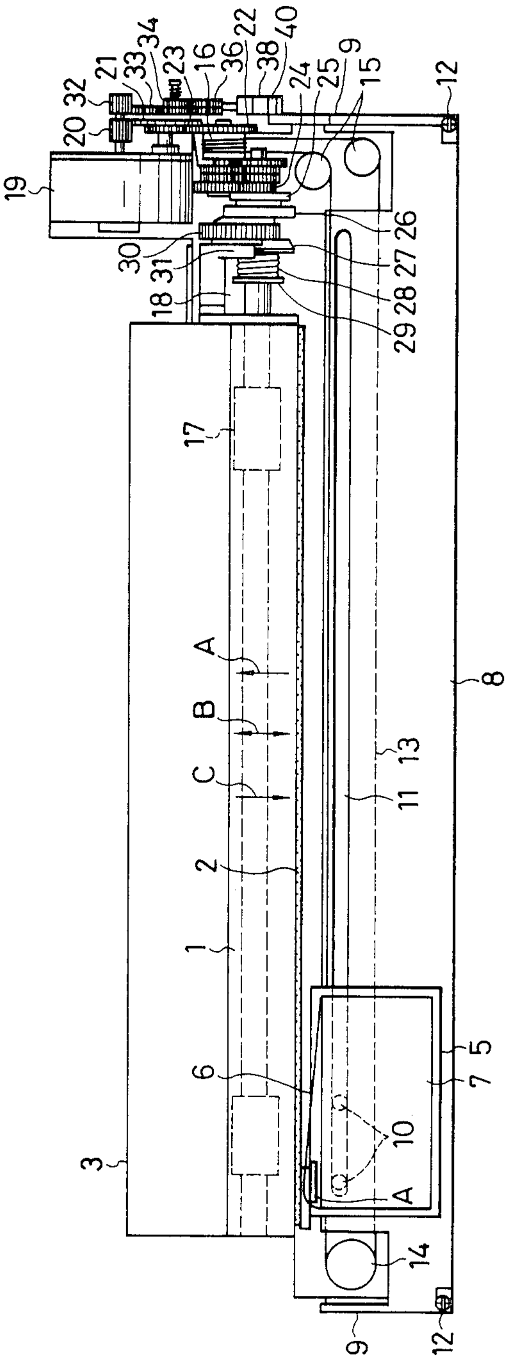
FIG. 9 PRIOR ART
FIG. 9 is a plan view showing the whole structure of a conventional thermal printer.
Figure 10A:
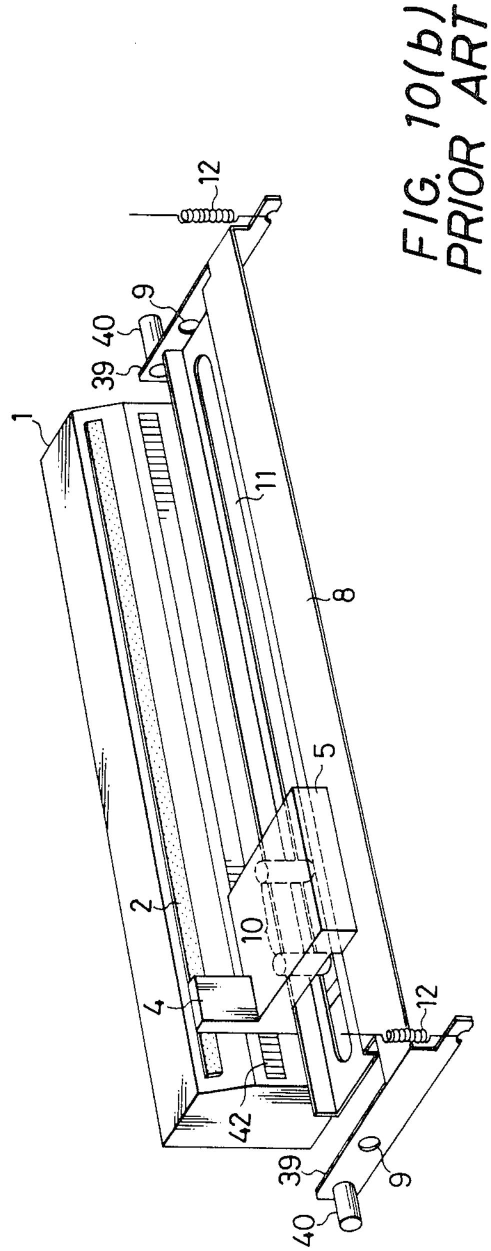
FIG. 10(a) PRIOR ART
FIG. 10(*a*) is a perspective view of the carriage and its surroundings of the printer shown in FIG. 9.
Figure 10B:
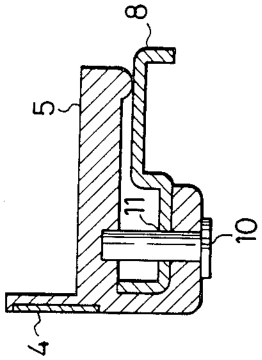
FIG. 10(b) PRIOR ART
Figure 11A:
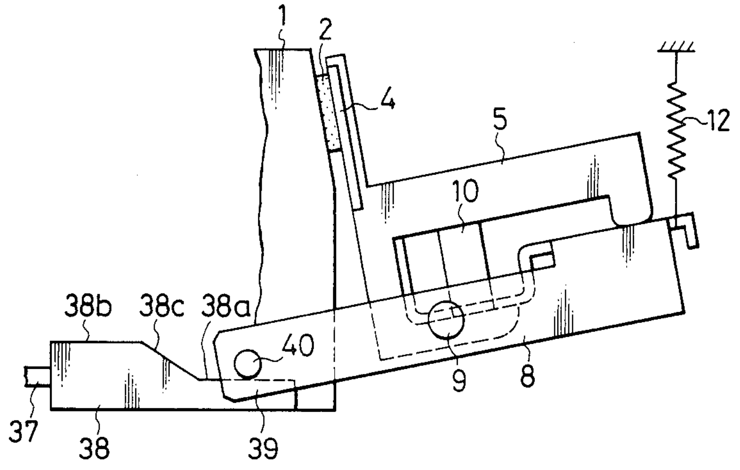
FIG. 11(a) PRIOR ART
FIG. 11(*a*) is a fragmentary side elevation of the printer shown in FIG. 9, for showing the operation for lowering the thermal head.
Figure 11B:
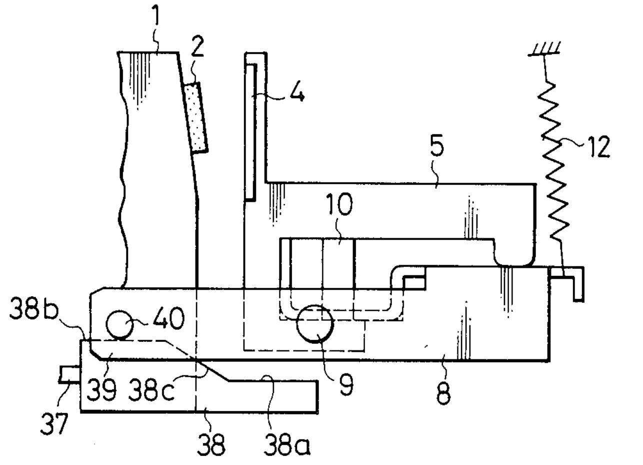
FIG. 11(b) PRIOR ART
Figure 12:
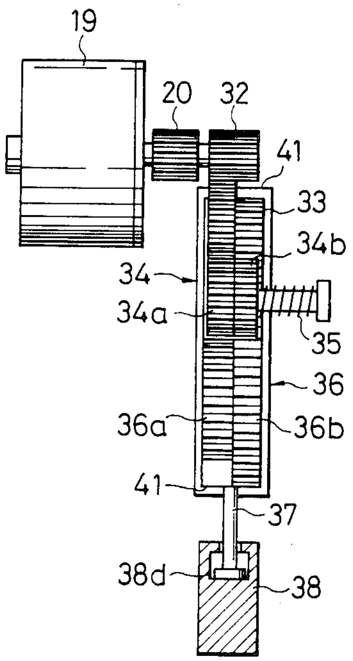
FIG. 12 PRIOR ART
FIG. 12 is a plan view partially in cross section of the cam-driving mechanism of the printer shown in FIG. 9.
Figure 13:
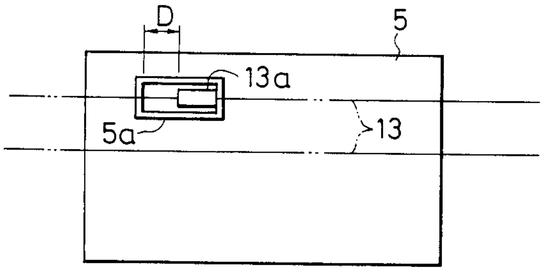
FIG. 13 PRIOR ART
FIG. 13 is a fragmentary bottom view of the printer shown in FIG. 9, for showing portions by means of which the carriage is connected to a wire.
Figure 14:
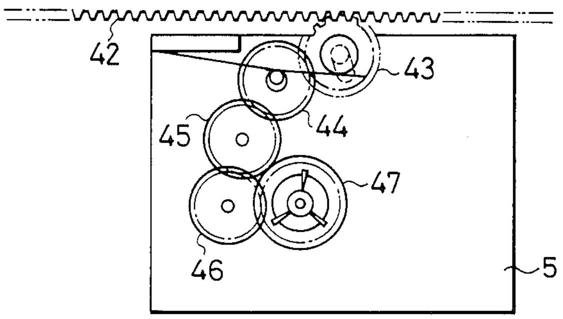
FIG. 14 PRIOR ART
FIG. 14 is a schematic representation for illustrating the print tape winding mechanism of the printer shown in FIG. 9.
Figure 15:
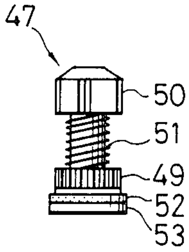
FIG. 15 PRIOR ART
FIG. 15 is a front elevation of the winding bobbin unit of the printer shown in FIG. 9.
Figure 16:
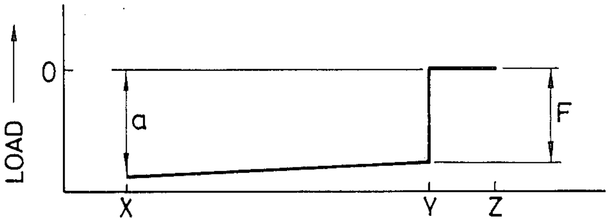
FIG. 16 PRIOR ART
FIG. 16 is a diagram showing the characteristic of the load applied by the conventional thermal head.

The load characteristic of this modified example of thermal printer is shown in FIG. 8. In this diagram, bent line p indicates the characteristic of the load associated with the tension spring 70, and bent line q indicates the characteristic of load associated with the auxiliary load 78. Where the auxiliary spring 78 is added as in this modified example, the desired force F can be obtained by simply applying a load that is substantially half the load a, provided that the tensile spring 70 and the auxiliary spring 78 are equal in tensile strength, because both springs 70 and 78 act to press the head against the platen. In this diagram, a indicates the maximum value of the load applied to the cam.

In the novel thermal printer described above, the gear for winding print tape can come into and out of engagement with the winding rack. Therefore, the modules for these gears can be made large. Consequently, the winding gear and the winding rack can come into mesh with each other, and the thermal printer operates reliably.

What is claimed is:

1. In a thermal printer of the type comprising a platen extending longitudinally for supporting a recording paper thereon, a carriage supporting a print head which is reciprocally movable longitudinally along said platen and angularly movable toward said platen for printing and away from said platen for non-printing, said carriage including means for holding a print tape thereon and means including a gear rotatably mounted on said carriage for winding the print tape, a winding rack disposed longitudinally parallel to said platen and having a plurality of teeth arrayed along a printing length thereof, said rack being movable such that its teeth are brought into engagement with said winding gear for winding the print tape for printing and brought out of engagement from said winding gear in order not to wind the print tape during non-printing, and driving means for moving said carriage toward the platen and said rack teeth into engagement with said winding gear for printing and for moving said carriage away from the platen and said rack teeth out of engagement from said winding gear for non-printing, the improvement wherein said driving means comprises said rack having said teeth arrayed on a plate extending longitudinally parrallel to said platen and one end of said plate fixed to a lever pivotably mounted at one end of said platen, and pivoting means at said end of said platen for pivoting said lever to bring said plate into or out of contact with a portion of said carriage so as to angularly move it and said print head supported thereon toward and away from said platen and at the same time to bring said rack teeth into and out of engagement with said winding gear on said carriage.

2. A thermal printer according to claim 1, wherein said lever pivoting means comprises a rotatable driving plate having a groove which is engaged with a pin connected to one end of said lever.

3. A thermal printer according to claim 1, wherein said carriage portion includes a hook arranged at a lower surface of said carriage which is engageable upon movement of said winding rack.

* * * * *